O. W. STOW.
Sausage Filler.
No. 48,598.
Patented July 4, 1865.
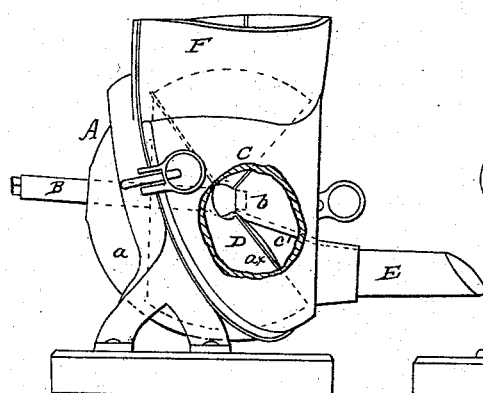
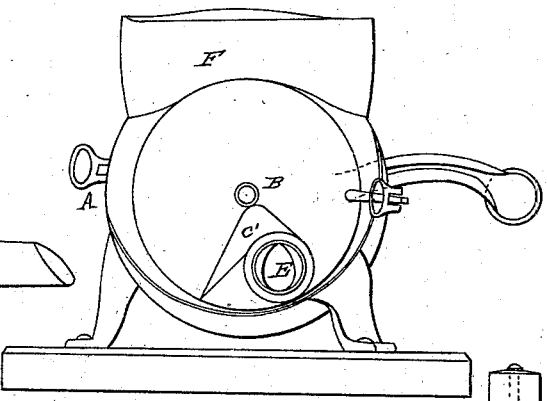
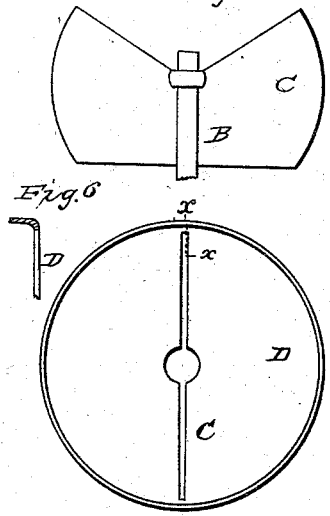
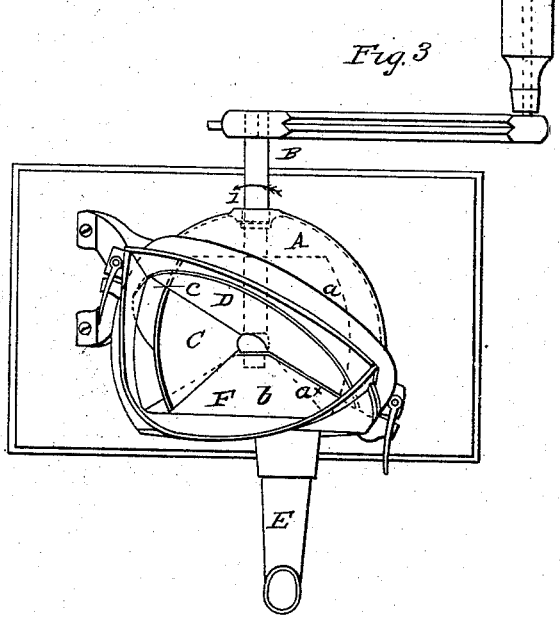
WITNESSES
INVENTOR

UNITED STATES PATENT OFFICE.

O. W. STOW, OF PLANTSVILLE, CONNECTICUT.

IMPROVED SAUSAGE-FILLER.

Specification forming part of Letters Patent No. 48,598, dated July 4, 1865.

*To all whom it may concern:*

Be it known that I, O. W. STOW, of Plantsville, in the county of Hartford and State of Connecticut, have invented a new and Improved Machine for Filling Sausages, and for other purposes; and I do hereby declare that the following is a full, clear, and exact description thereof, which will enable others skilled in the art to make and use the same, reference being had to the accompanying drawings, forming part of this specification, in which—

Figure 1 is an end or edge view of my invention; Fig. 2, a front view of the same; Fig. 3, a plan or top view of the same; Fig. 4, a detached view of the rotary piston pertaining to the same; Fig. 5, a detached view of the rotary slotted disk pertaining to the same; Fig. 6, a section of Fig. 5, taken in the line $x\ x$.

Similar letters of reference indicate like parts.

This invention consists in the employment or use of a case constructed or cast in the form of a portion of a sphere and a cone, and provided with a rotary slotted disk, in or through which the piston works, the disk rotating in an oblique plane in the hopper, and all arranged substantially as set forth, whereby a very compact and efficient implement is obtained for filling sausages and for other purposes.

A represents the case of the device, one part, $a$, of which is a portion of a sphere, and the other part, $b$, a cone, which may be described as passing horizontally and concentrically into $a$. (See Fig. 3.)

B is a shaft, which passes horizontally and centrally into the case A, and has a piston, C, upon it, one end of which at each side of the shaft is beveled or inclined to work against the cone portion $b$ of the case, as shown in Fig. 3.

D is a circular disk, which is placed obliquely in the case A, or has an oblique position with the shaft B, on which the disk is fitted, and is made to turn with it. The disk is slotted, as shown at $c$ in Fig. 5, for the piston C to pass through. The inner end of the shaft B has its bearing in the apex or inner end of the cone part $b$ of the case, and said cone part $b$ is provided with an enlargement, $c'$, and a nozzle, E.

F is a hopper at the upper part of the case A, into which the meat is placed, and it will be seen that as the shaft B is rotated the disk D will rotate in a plane which has an oblique position relatively with the shaft B, and that a cut-off or abutment will be formed at the line $a^{\times}$, where the disk D is in contact with the cone part $b$ of the case. The meat therefore, when the piston C is turned in the direction indicated by arrow 1, will be forced down before the same and expelled through the nozzle E. Thus by a continuous rotation of the shaft B in one direction the meat will be forced through the nozzle E into the case fitted on the nozzle.

I would remark that this device will answer for a rotary fan or blower, and also for a pump. It may be manufactured at a reasonable expense, and there are no parts liable to get out of repair or become deranged by use.

Although the globular or spherical form for the case would perhaps be most desirable, still other forms may be used.

Having thus described my invention, I claim as new and desire to secure by Letters Patent—

The case A, composed of a section of a hollow sphere, $a$, or of other suitable form, and a cone, $b$, in connection with a slotted disk, D, placed obliquely on the shaft B, and a piston, C, all arranged to operate in the manner substantially as and for the purpose herein set forth.

O. W. STOW.

Witnesses:
HENRY H. CLARK,
STEPHEN WALKLEY, Jr.